Jan. 16, 1951 G. TOUVET 2,538,062

LIGHT COMMUNICATION SYSTEM

Filed Feb. 5, 1946 5 Sheets-Sheet 1

INVENTOR.
GUY TOUVET
BY M. O. Hayes
ATTORNEY

LIGHT COMMUNICATION SYSTEM

Filed Feb. 5, 1946 5 Sheets-Sheet 2

INVENTOR.
GUY TOUVET
BY M. C. Hayes
ATTORNEY

Jan. 16, 1951

G. TOUVET 2,538,062

LIGHT COMMUNICATION SYSTEM

Filed Feb. 5, 1946

5 Sheets-Sheet 3

INVENTOR.
GUY TOUVET

BY M. O. Hayes

ATTORNEY

INVENTOR.
GUY TOUVET
BY M. O. Hayes
ATTORNEY

LIGHT COMMUNICATION SYSTEM

Filed Feb. 5, 1946 5 Sheets-Sheet 5

INVENTOR.
GUY TOUVET
BY M. O. Hayes
ATTORNEY

Patented Jan. 16, 1951

2,538,062

UNITED STATES PATENT OFFICE 2,538,062

LIGHT COMMUNICATION SYSTEM

Guy Touvet, Orleans, Loiret, France

Application February 5, 1946, Serial No. 645,626
In France March 22, 1940

41 Claims. (Cl. 250—7)

This invention relates to commuunication and radar systems; and in particular to light radiation transmitters and receivers which are operated so as to achieve military security as well as reliable communication, radar location, remote control or television. The general system can use light radiation of any wave length or from the whole spectrum as desired, but infrared or ultraviolet radiation is more useful in "blackout" communications for military security and for reliability in foggy weather.

It is well known in electronics engineering to utilize the radiation from various gases and vapors in discharge tubes as a carrier, with the direct current that excites the tube modulated by an audio voltage or telegraphic impulses. Because of the general distribution of this radiant energy in spectral lines from infrared to ultraviolet, only a small portion is usable in infrared or "blackout" transmission. The rest is lost in filters which must be very opaque to all but infrared if secrecy is to be maintained. An effective filter is usually somewhat opaque to the infrared as well, so a further loss occurs. The gas tubes commonly used are limited to small power and to current densities whose peaks are considerably less than 100 amperes per sq. cm., if favorable tube life is expected. Thus only a limited transmision range has been obtainable. Tube electrodes may be heated by a filament or self-heated by the tube current.

Further, light modulation with the audio or telegraphic voltage directly does not present electronic security because any audio frequency receiver which can pick up a usable input signal will give the modulation signal as its output.

In contrast, the light modulation system of this invention utilizes radio-frequency current, or very high amplitude D.-C. pulses of short duration which are rich in radio frequency transients, for excitation of a light source to achieve markedly better results. Naturally, known steps are taken to avoid any radio-electric radiation into space. When the light source is one or more of the rare gases such as xenon, helium, neon, or krypton at low pressure in an electrical discharge tube, R.-F. excitation causes an increase in radiation in some particular portion of the spectrum, depending on the gas and frequency in use; broadens the line spectrum into a band spectrum; enhances the radiation of lines which are of very low amplitude with conventional excitation; and permits greater current densities in the tube with the resulting increased light power output and without distortion or overloading of the modulation.

The increase in radiation in some particular portion of the spectrum corresponds generally to a redistribution of energy in the spectrum.

Certain metallic vapors may also be used, for instance caesium, in transmitting infrared. If mercury vapor is used, transmission will be in the ultraviolet region.

Pulsed operation at very high levels causes the increase in light output to exceed the increase expected from a given current increase, if any. This may be due to increased gas tube efficiency at high current levels.

Thus higher densities of current and large increases of light power output are achieved without distortion or overloading and with increased reliability and transmission range.

When xenon gas is used in a tube with R.-F. excitation, a redistribution of radiant energy into the infrared region is particularly evident. The spectral lines of the infrared portion of xenon's spectrum are increased in amplitude and broadened into bands, concentrating a greater portion of the radiant energy in the infrared region. Filtering for "blackout" operation is much easier with this rich source of infrared radiation. Such a tube has also the special advantage of permitting an easy modulation of the infrared output at radio frequency and consequently has all the advantages inherent therein.

The radio-frequencies at which the light output is generated are determined by the condition of the power amplifier, in class A, B, or C; and by the plate circuit of the power amplifier, i. e., whether a tuned circuit is used with the gas tube or not. With Class A operation and only the gas tube in the plate circuit, the light output will be at the same freqency as the driving power applied to the amplifier's grid. This frequency is hereafter known as F. With class A operation and a tuned circuit across the gas tube, tuned to F, the resonant circuit causes an opposite voltage swing on alternate half-cycles. As this causes the current to go through zero as the voltage reverses, the light output has a double peak each cycle. Since the gas tube is a heavy load on the tuned circuit, these opposite voltage swings are damped to an amplitude lower than the swing when plate current rises. Under these conditions the light output will have an appreciable percentage of second harmonic, 2F. If the gas tube is tapped down on the tank coil of the power amplifier, it does not load the circuit as much and the reverse swings are almost equal to the swings caused by surges of plate current. Under these conditions, the light output is predominantly at 2F. With class B operation, where a tuned circuit is used as above described, the light output is the same as for class A operation. With class B operation with only a gas tube in the plate circuit of the power amplifier, the light output occurs only during alternate half cycles when plate current flows. This discontinuity of light output causes components of F, 2F, 3F, etc., to be present. With class C operation with only a gas tube in the plate circuit, the pulses in alternate half cycles are shorter than 180 electrical degrees and therefore the light output is again F with considerable component percentages of 2F, 3F, etc., adding a tuned circuit would decrease higher order harmonics but increase 2F, due to the reverse swing of the tank voltage.

The light from this R.-F. excited source may be received in a conventional receiver consisting of a photocell and audio amplifier, if the radio-frequency is single carrier, amplitude modulated, but the radio-frequency excitation can, if desired, be modulated in ways that add a high degree of electronic security, i. e., two-frequency carrier for constant amplitude, frequency modulation, speech inversion, and frequency shift keying. Reception is then impossible with such devices as audio receivers or infrared telescopes, and is possible only by the use of photo-sensitive devices coupled to the correct types of radio-frequency receivers. The threshold of sensitivity is lowered with respect to audio systems because parasitics and interferences of any but the correct type of radiation are without effect. Increased reliability and range of operation are obtained and the whole system is extremely difficult to jam. With complete secrecy it permits the use of recognizing signals, general frequency calls, true duplex (two way) or multiplex communications, and lock-in and following circuits for exact remote control of the optics without hunting because it makes possible transmission of several different frequencies segregated in different cross sectional portions of a single beam.

The generation of broad bands of radiation permits folding the gas tube into compact configurations, several layers thick, without losing much of the radiant energy by absorption in overlapping portions of the gas tube. This permits an improved optical system resulting in a large output of light for increased reliability and range operation and accurate control of the distribution of the signal in the beam.

With excitation of the tube at frequencies above 50 megacycles, shifts in the oscillator's frequency are accompanied by small shifts in the position of the enhanced bands of radiation along the spectrum. Large changes in radio frequency, e. g., from 60 mc. to 100 mc., cause the enhancing of spectral lines to occur at a different part of the spectrum. This shift is especially noticeable in the infrared spectrum when xenon gas is used, and this phenomenon makes it possible to readjust a band of light radiations to a required frequency band or to achieve a modulation system by shifting a band of light.

It is therefore an object of this invention to provide a system of radiation transmission that has markedly better performance and is capable of much greater security and reliability.

It is a further object to provide a light communication system in which starting and operation are automatic without requiring any hand manipulation apart from the power supply switch, including remote control, lock-in and following system for the optics.

Another object of the invention is to provide a system for the emission of light radiation comprising a tube containing a pair of electrodes and a gas, and means for exciting said tube solely with radio-frequency current to enhance emission from the gas of light radiation in particular frequency portions of the spectrum, said radiation having spectral characteristics distinct from the normal line spectrum of the gas in the tube.

According to another object of the invention the gas referred to in the preceding object is selected from the group consisting of the rare gases, mercury vapor, and caesium vapor.

It is a further object to provide an infrared source which includes a xenon gas tube excited by a radio-frequency current generator so as to emit most of its radiant energy in the infrared region and to be capable of handling a large power output, if necessary.

It is another object of this invention to provide a light source excited by radio-frequency current, in which the radio-frequency is modulated in one of several methods of modulation which take advantage of electronic circuits to achieve new levels of security and reliability in modulated light communication while, at the same time, making jamming very difficult. These circuits include class C operation, two-frequency constant amplitude telegraphy and telephony, frequency shift keying, and frequency modulation of the radio-frequency generator.

It is another object of this invention to provide a light source excited by one or more radio frequency currents in such a way that the radiation band of light can be shifted.

It is another object of this invention to provide for range finding or television a xenon light source that is excited by extremely short duration high amplitude current pulses. Such a source is capable of producing corresponding light pulses of extremely short duration and great power with much more radiation output than the equivalent D. C. or ordinary audio power excitation produces and with broadening of the spectral lines into broad bands of radiation, particularly in the infrared region.

A still further object of the invention is to provide a radiation source excited by radio-frequency voltages, where special, compact gas tube configurations are used to intensify the radiation source and to present known impedance in radio frequency.

With the above objectives in view, reference is made to the drawings which are merely illustrative of a preferred embodiment of this invention, showing a schematic arrangement for accomplishment of "blackout" transmission.

Figure 1:
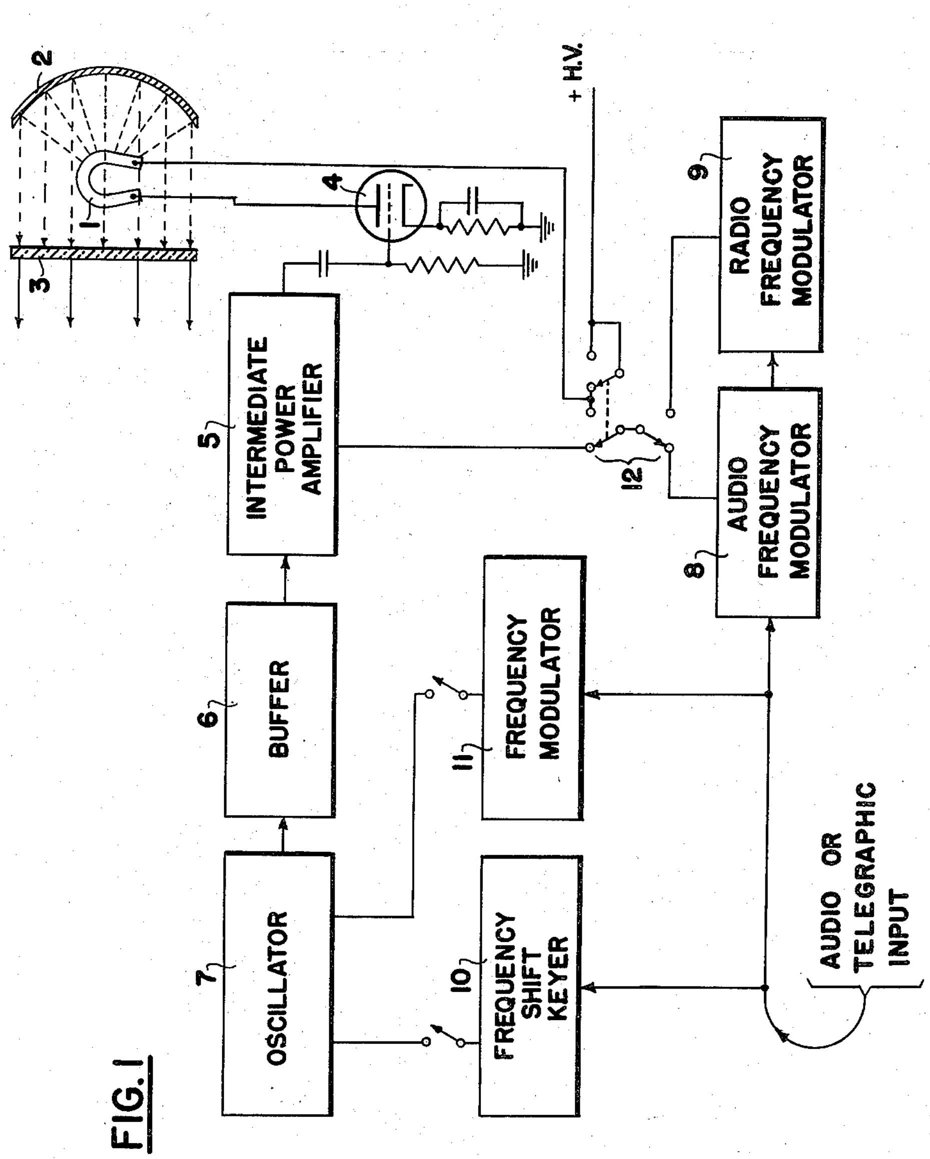
Figure 1 is a schematic diagram of a light source and excitation system therefor.

In Figure 1, the gas tube 1 containing a rare gas such as xenon at low pressure, for example, in the order of 3 to 60 mm. of mercury, is mounted at the focal point of mirror 2; and its radiant energy output enters filter 3 which passes only infrared radiation. Tube 1 is the plate load for power amplifier 4 which generally must have an extremely low internal resistance sometimes as low as 50 ohms. Tube 1 obtains its excitation current therefrom. Intermediate power amplifier 5, buffer 6, and oscillator 7 provide stable driving power at the desired voltage and frequency. Modulator 8 is used when the R.-F. is to be audio modulated. Modulator 9 is used when the R.-F. is modulated by a second R.-F. This modulation system can be applied to either the intermediate power amplifier or the power amplifier to vary its output and so impress the audio or telegraphic voltage on the carrier. Transfer switch 12 accomplishes the above connections as desired.

If frequency shift keying is used, the frequency shift keyer 10 is connected according to known art.

If frequency modulation is used, the frequency modulator 11 is connected according to known art.

Figure 2:
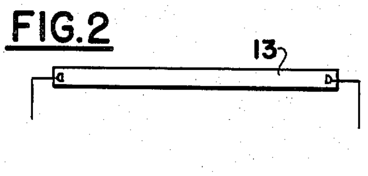
Figure 2 is a view of a conventional gas discharge tube.

In Figure 2, tube 13 represents the simplest known form of gas discharge tube.

Figure 3:
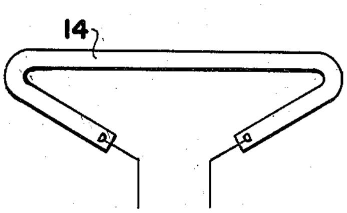
Figure 3 is a view of another conventional gas discharge tube.

In Figure 3, tube 14 still uses but a single passage of the tube, but folds the ends back so as to keep connectors and mounting close together.

Figure 4:
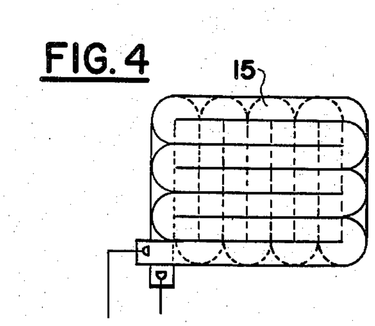
Figure 4 is a front view of a non-inductive configuration for a gas discharge tube used in the system of Figure 1.

In Figure 4, tube 15 is folded compactly upon itself in successive layers to multiply the light emanating from a small-area source over that which a single tube would give for the same current density. It has a very small self-inductance for a relatively long length of tube.

Figure 6:
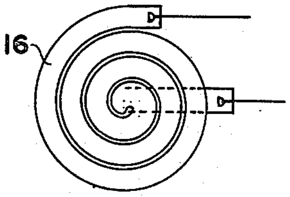
Figure 6 is a front view of an inductive configuration for a gas discharge tube for use in the system of Figure 1.
Figure 7:
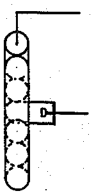
Figure 7 is a side view of the tube of Figure 6.

In Figure 6, tube 16 is wound helically into a flat coil to accomplish the same concentration of light, and also to have self inductance which as later appears may be utilized to advantage. Several of these coils may be stacked on each other to multiply the effect.

Figure 8:
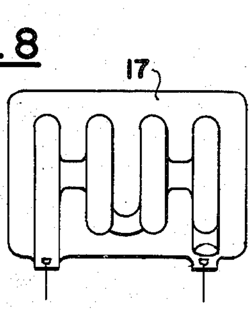
Figure 8 illustrates an inductive configuration of several coils of the type shown in Figure 7 housed in a glass envelope of special design.

In Figure 8, tube 17 is one of the compactly folded tubes, mounted inside an envelope. The tube opens at one end into the envelope which is at the low gas pressure. The electrical path is from one electrode, through the tube, to the other electrode, mounted in the envelope. Part of the gas in the envelope is excited by induction.

In each of Figures 4 to 8, plane of coil is normal to axis of propagation.

Figure 9:
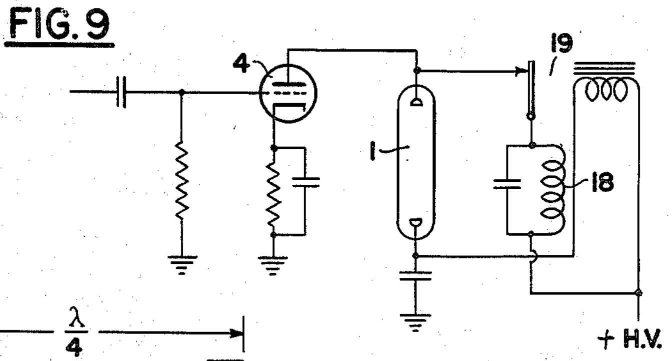
Figure 9 is a schematic diagram of a starting circuit with a relay for switching to operating position.

In Figure 9, the gas tube 1 is shunted by an impedance or a resonant circuit 18 through the contacts of relay 19. The coil of relay 19 is in series with the tube and the high voltage supply. When the tube 1 does break down heavy current flows through relay 19, the contacts are opened and the tube is left unshunted.

Figure 10:
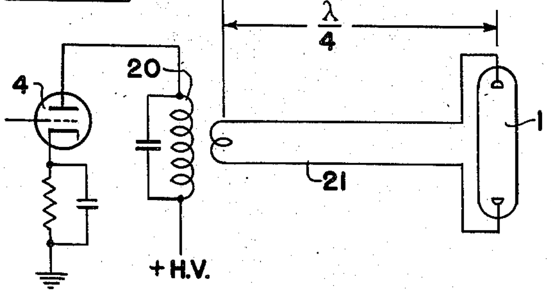
Figure 10 is a schematic diagram of another starting circuit which depends on a mismatched quarter-wave line to get breakdown voltage.

In Figure 10, the gas tube 1 is at the end of a quarterwave section of transmission line 21. The transmission line is inductively coupled to tank circuit 20 of power amplifier 4. When the tube is not conducting, the quarter-wave section line is effectively "open ended" and has a high voltage at the tube. When this voltage breaks the tube down, an approximate match of impedances occurs and the standing wave is substantially reduced.

Figure 11:
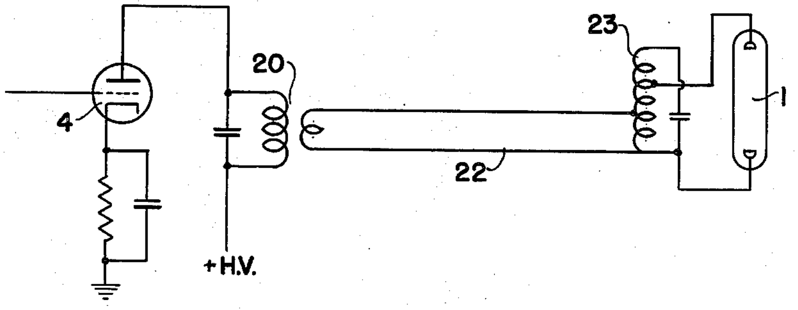
Figure 11 is a schematic diagram of another starting circuit where a coaxial line is coupled from the amplifier to a remote tank circuit across which the gas tube is connected.

In Figure 11, a tank circuit 23 is at the end of a long length of coaxial line 22 with the gas tube 1 connected across it. When the tube is not conducting, the tank circuit 23 has a high voltage across it due to energy transferring from amplifier 4. The gas tube is connected across the tank at points where an impedance match is approximated, once the gas tube breaks down, i. e., carries current.

Figure 12:
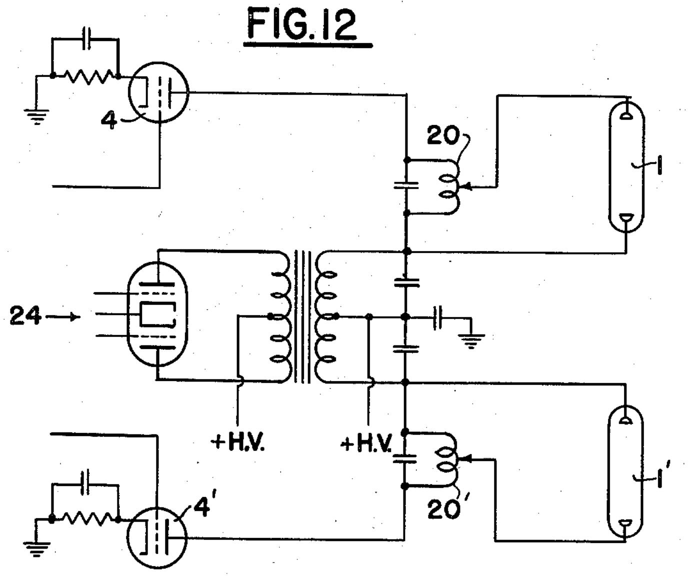
Figure 12 is a schematic diagram of the two-frequency exciter, where two radio-frequency amplifiers are modulated so as to maintain constant light output from overall system.

In Figure 12, two radio-frequency oscillators 4 and $4^1$ are tuned to respectively different frequencies and modulated by audio amplifier 24 so that the total light output from tubes 1 and $1^1$ is of constant intensity. Thus, any conventional audio receiver would not receive the intelligence contained in the modulation.

Figure 13:
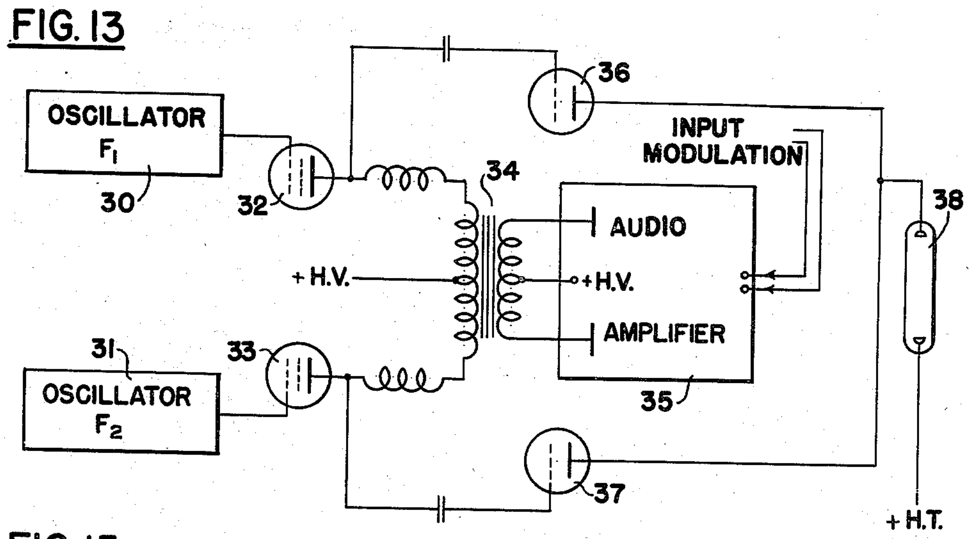
Figure 13 is another schematic diagram of a constant amplitude infrared output system for transmission of telephony utilizing two radio-frequency oscillators tuned to different frequencies and exciting a single tube.

In Figure 13, two radio frequency oscillators 30 and 31 are tuned to different frequencies and the two radio frequency outputs are modulated at 32 and 33, 180 degrees out of phase with respect to each other by a center tap transformer 34 connected to the output of an audio amplifier 35. Modulated stages 32 and 33 supply the excitation to two power stages 36 and 37, the plates of which are connected to one electrode of a gas tube 38, the other electrode being connected to high tension. When correctly balanced this also provides telephony with substantially constant amplitude infrared output.

Figure 14:
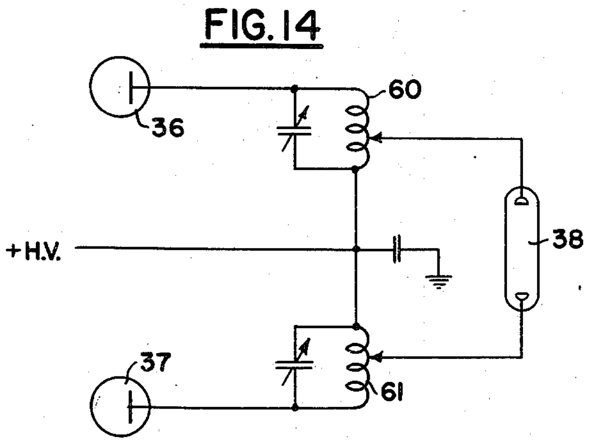
Figure 14 is a schematic diagram of a constant amplitude transmitter similar to that shown in Figure 13 but showing the outputs of the two power stages exciting the tube through two tank circuits.

In Figure 14 is shown a constant amplitude transmitter similar to that shown in Figure 13 but showing the output of the power stages 36 and 37 exciting tube T through two tank circuits 60 and 61.

Figure 15:
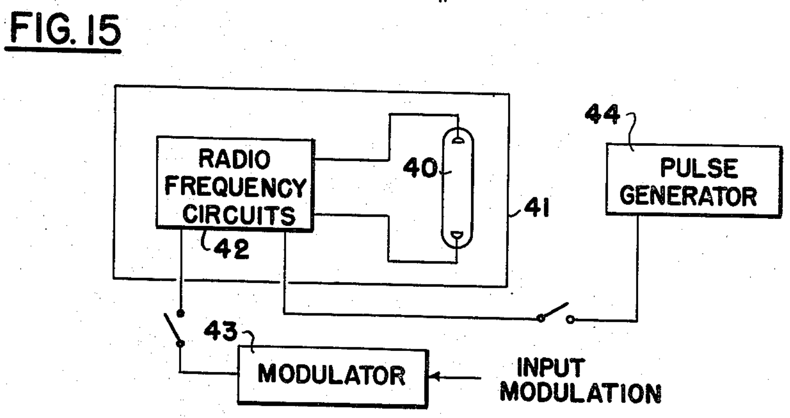
Figure 15 is a schematic diagram of a gas tube exciter in which the gas tube is a part of the oscillator. Such a system is particularly useful for pulse operation or for shifting the band of radiation.

In Figure 15 is shown the use of a rare gas filled tube 40 forming a part of a radio frequency oscillator 41 in conjunction with the necessary radio frequency circuits 42. Modulator 43 is used when the light radiation is to be modulated. Pulse generator 44 is used when pulse operation is desired to control the oscillator circuit 42 and tube 40 which produce the corresponding light pulses. In such a circuit, the tube, instead of being driven by a forced radio frequency oscillation, actually itself comprises part of the oscillating circuit.

Figure 16:
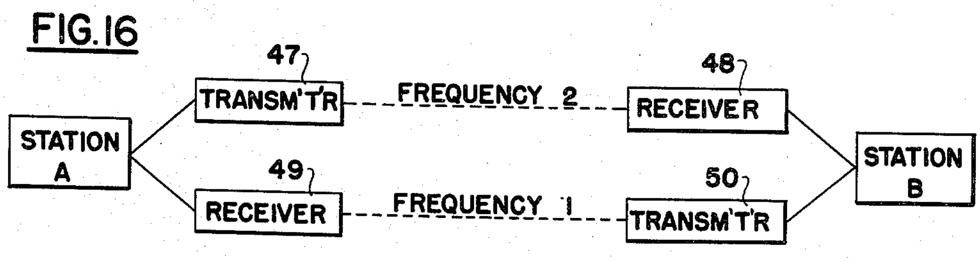
Figure 16 is a schematic diagram for a two-way (duplex) communication system.

Figure 16 represents a two way (duplex) light communication system between station A and station B. Transmitter 47 and receiver 48 constitute one channel, transmitter 49 and receiver 50 another channel. Each of these channels works on a different combination of frequencies so station A and station B can transmit and receive simultaneously.

Figure 17:
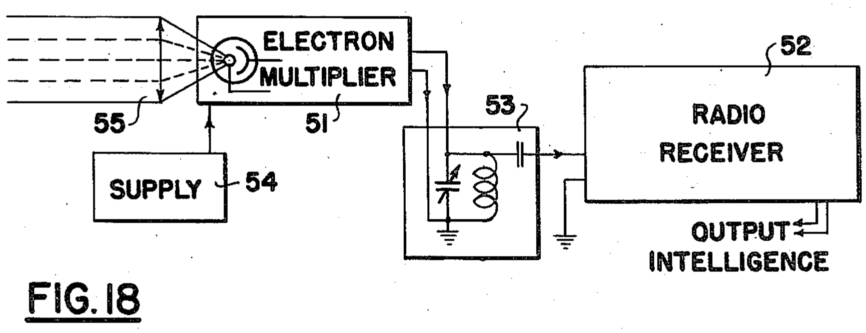
Figure 17 is a schematic diagram of a light communication receiver including an electron multiplier and its coupling to a radio frequency receiver.

In Figure 17 a photosensitive device 51 which includes an electron multiplier is coupled to a radio frequency receiver 52 of high amplification factor by means of a tank circuit 53 so as to excite the tuned circuit with the impulses received by the device 51. The numeral 55 is the optic which concentrates the light on the photosensitive surface of 51, and 54 is the power supply for multiplier 51.

Figure 18:
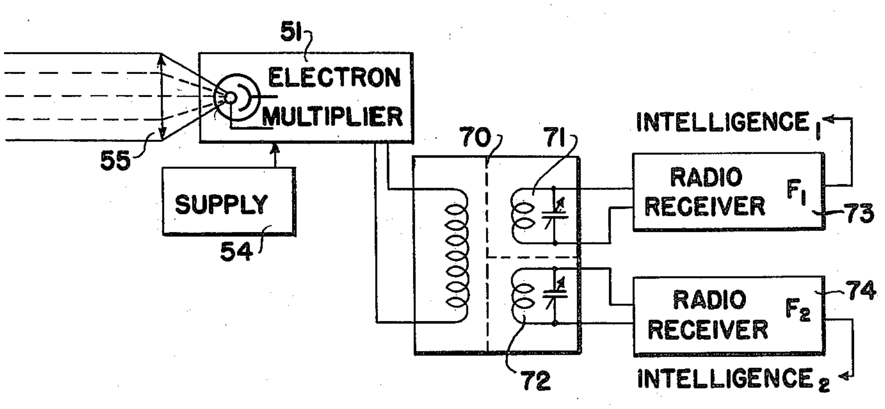
Figure 18 shows another form which the coupling and receiver shown schematically in Figure 17 may take, the coupling comprising a R.-F. transformer having a plurality of secondary coils, each of which feeds a separate receiver.

In Figure 18 the tuned circuit and R.-F. receiver of Figure 17 are replaced by a R.-F. transformer 70 having two secondary coils 71 and 72 feeding respectively receivers 73 and 74 at different frequencies.

Figure 19:
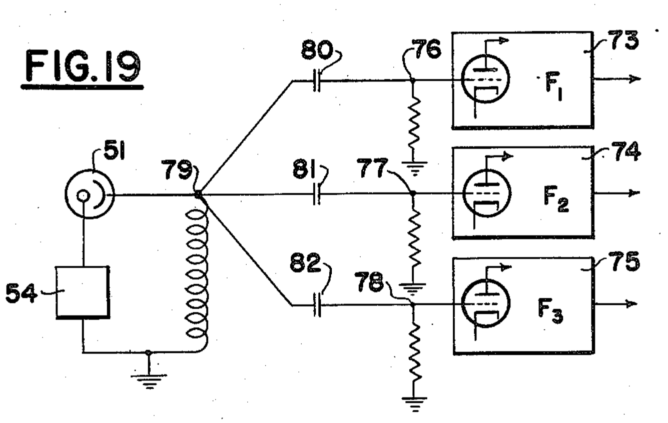
Figure 19 shows another form of coupling to a number of separate receivers.

In Figure 19, the tuned circuit 53 and receiver 52 of Figure 17 are replaced by inductance 79, coupling capacitors 80, 81 and 82, and inputs 76, 77, and 78 to receivers for various radio frequencies.

The gas discharge tube was filled with xenon gas because it is much richer in infrared output than the other rare gases when excited with radio-frequency current. This xenon-filled tube was mounted in an optical system which can be filtered to pass infrared substantially to the exclusion of other radiation, and would concentrate its radiant output into a beam. The other rare gases can be used as desired, in place of the xenon; and the optical system can be unfiltered to use any radiation in the spectrum or filtered to select any band from ultra-violet to infrared where this increase in amplitude and broadening of spectral lines into bands occurs. The electronic system for exciting this gas tube was a radio-frequency generator capable of modulation by several methods.

When this R.-F. excitation is applied in place of the conventional D.-C. or audio, several significant changes occur which this invention utilizes to secure marked improvements in a light communication or radar system and other applications such as remote control. These changes are:

(*a*) As compared with other forms of excitation and for the same excitation power, a particular portion of the rare gas's spectrum shows a large increase in radiant output, apparently due to a redistribution of energy along the spectrum and to the excitation of new lines of the spectrum. This effect is especially evident with xenon gas, with which gas it occurs predominantly in the infrared region. Only a small percentage of visible light is produced and the filtering is easy to obtain for visual secrecy. As this xenon tube permits a fluent modulation of infrared at radio-frequency it therefore presents all the advantages inherent in the use of this type of excitation.

(*b*) The radiation occurs in broad bands rather than sharp lines, possibly due to forced oscillation-excitation of the rare gas.

Because of the amplified and broadened emission, more power is allowed without overloading and distortion. This distortion would appear when using less power if one single ray of the spectrum were used because its intensity would necessarily have to be extremely great to get the same light output as is obtained with a band of light which permits localization of a large quantity of energy. Thus the tube can utilize higher tube current intensities and emit greater light output without distortion than are obtainable with conventional excitation which give the spectrum of lines characteristic of the element used rather than broad bands.

(*c*) Because of R.-F. current distribution in a conductor, much higher current densities can be used for a given current to the tube than are obtainable with D.-C., without damage to the tube or distortion of the modulation, which results in greater power and light output.

(*d*) The frequency, intensity, pressure of the gas, the wave form of the exciting current and the shape of the tube are the principal factors which control the transition from the characteristic radiation line spectrum of the element used to the forced radiation broad band spectrum.

High current peaks of short duration are particularly favorable to the development of the spectral rays of the xenon for example. Current densities of 100 amperes per square centimeter can be obtained and usefully employed, a feature which is highly important for certain applications requiring high intensity pulses such as range finders and infrared radar. With xenon gas particularly, a great intensity of light has been obtained during very short pulses of radio frequency currents, for example, approximately ten kilowatts of instantaneous power with a pulse of one microsecond, Figure 15. Even higher ratings can be reached. The small fraction of light which is reflected by an obstacle can be sufficient to allow reception and can be distinguished from any other signal as a result of the use of radio-frequency excitation. Thus, infrared radar operation becomes possible. While it is not capable of such a range as ordinary radar, it has a high degree of secrecy and reliability and is very difficult to jam.

Such pulses of light can help to solve numerous problems particularly in television, low altitude altimeters, range fingers and remote control by means of an infrared beam.

(*e*) The electronic circuits of the R.-F. amplifier are capable of operation in class B, class C, or pulsed output to obtain high peak currents for short portions of each cycle. When the xenon tube is driven in class C or pulses, the infrared output increases several times more than would be expected from the current change which occurred when the power amplifier was driven to this class of operation. The widening of the xenon spectrum from lines to bands is even more pronounced with this excitation. In one test, driving a bank of paralleled triodes into class C operation increased plate current from 0.850 to 1.150 amperes, a current increase of about 35%, whereas the infrared output increased 2.3 times. Modulation was essentially linear, just as with class B or class A. In other words, the modulation peaks are increased and the output efficiency of the luminous emission is improved.

(*f*) Radio-frequency excitation permits the use of very simple starting circuits, Figure 9. Additional reactances or tuned circuits as appropriate to obtain the required radio-frequency breakdown voltage can be connected across the gas tube and may be cut out if necessary by a relay which may conveniently be in one of the D.-C. supply leads of the radio frequency source. Once the gas tube breaks down, the variation of load causes a variation of direct current and operates the relay. Generaly, R.-F. excitation and high voltage are interlocked by a relay in a modulated stage cathode. When discharge of the gas tube stops, the entire device returns automatically to the initial condition ready to begin operation again, thus avoiding any manual operation and constituting a protective feature for the equipment. On transmission lines, the mismatch of a cold gas tube can be used to get high voltage standing waves which decrease or disappear when the tube breaks down and becomes matched to the line, Figure 10. A tuned "tank" circuit may be connected to the end of a long length of line and the tube shunted across all or a portion of this tank as appropriate to get breakdown. Approximate impedance match then occurs with breakdown, Figure 11.

(*g*) Within the radio-frequency generator, various forms of modulation can be applied. Audio-frequencies, or telegraphic impulses can be applied as modulation in any of the low power buffers or intermediate power amplifiers so long as the power amplifier is operating as a linear stage. Class C or pulsed operation of the power amplifier requires a high level modulator. For greater security two frequency modulation can be used, where the secrecy of the signals is maintained because the apparent intensity of the light source remains constant. This is accomplished by variation of the radio frequency which modulates the light without changing the value of the current feeding the discharge tube. The two radio frequency voltages are modulated by the audio or telegraphic voltage so their total amplitude is constant and this R.-F. combination then excites the gas tube. This constant amplitude modulation is not detectable on a conventional receiver consisting of photocell and audio amplifier or with devices which do not receive radio-frequency such as I-R telescopes, or by the human eye. The signals can be detected only by receivers tuning to one or the other of the chosen frequencies.

For telegraphy the most simple modulation is by alternately transmitting two frequencies so that they correspond to telegraphic signals or spaces while the current exciting the gas tube remains constant.

For telephony, the result can be obtained by varying only the relative percentages of the two radio frequency currents in the discharge tube while their total remain constant. One way to achieve this is by modulating the two radio frequencies with an audio modulation 180 degrees out of phase relative to each other, as by use of a center tap modulation transformer, Figure 13. This is an amplitude modulation system.

The same degree of secrecy is obtainable with frequency shift keying and frequency modulation which are connected to the oscillator circuit, if used, as they act on the oscillator. Double frequency, frequency modulation, and frequency shift keying offer electronic security from reception on anything but the right kind of receiver, and at the same time the system excludes other signals or parasitics.

(*h*) A receiver for this radiation would have an optical system, a light filter, if desired, to exclude extraneous radiation, and a photosensitive cell, with the cell's electrical output going to a radio receiver capable of utilizing the type of R.-F. excitation and modulation which were imposed on the light. When using Class C R.-F. excitation of the gas tube, the sine wave is preferably restored at the reception end by means of a convenient coupling circuit, such as shown in Figure 17, previous to feeding the signal to the R.-F. receiver.

Coupling circuits utilizing pure inductance permit coupling of one cell to different receivers tuned to different frequencies for simultaneous reception of different signals through a single phototube, (Figure 19). Such a system is useful in following circuits for remote control of optics where several frequencies segregated in different portions of a single light beam are used. However the coupling between the cell and receiver is preferably achieved in such a way as to avoid any appreciable ohmic resistance in the output circuit of the cell or photosensitive element. In this way, effects of luminous parasitics and interferences are practically eliminated. Maximum sensitivity, selectivity and efficiency are obtained for the radio frequency of excitation of the light and jamming of any kind prevented. The cell can conveniently be one which incorporates an electron multiplier. The use of such multipliers for weak signals is extremely easy and efficient with this type of R.-F. excitation because light interferences, regardless of their nature, do not affect the output circuit. In such devices the multiplier can be advantageously combined with a radio receiver of a high amplification factor.

Such use of electron multipliers would be impossible with audio frequency amplifiers due to parasitics or interferences which always occur, however weak they may be, because the unwanted signals are amplified along with the signal to be utilized.

If necessary, larger optical systems can be effectively employed for reception purposes without adding to the difficulties which occur at audio frequency methods in which the parasitics or interfering signals are increased at the same time, particularly in fog when light is scattered.

The radio receiver can be a tuned-radio-frequency amplifier with detector and amplifier, a simple super-heterodyne receiver, a "double I.-F." superheterodyne receiver, or a special receiver with F.-M. limiter stages and discriminators or a regenerative or super regenerative receiver. The various receivers are well known to electronic engineering, and give, in combination with the photosensitive element, an overall system sensitivity much higher than the audio modulated system. In other words the threshold of sensitivity is lowered as compared to audio frequency method and the lowering of the noise level without lowering the amplification of the signal results in increased discrimination and identification.

Numerous applications of the above are contemplated, for instance, use as a recognition signal to identify light transmitters such as I. F. F., use in producing a general call frequency, use by assigning special frequencies to different vessels, use in true duplex and multiplex communications, and use in remote control of optics such as in lock-in and following circuits.

A true duplex system of light communication Figure 16 is difficult to obtain with the use of audio frequency reception methods as there is feed back between transmitter and receiver at one end of the link due to the scattering of the light. In order to prevent oscillation it is necessary to reduce the amplification of the audio receiver and, therewith, the range, or to interrupt transmission in order to receive. The use of radio frequency excitation to produce and receive the radiations permits, on the other hand, continuous (true) duplex operation with full sensitivity and maximum range because as in ordinary true duplex radio, simultaneous transmission and reception can be carried on at two different frequencies.

An efficient automatic lock-in and following system for the remote control of the optics of the equipment can be achieved simultaneously with the transmission of the signals (key or phone). The "lock-in" signal is a frequency superimposed as by "double modulation" on the constant amplitude radio frequency currents which feed the tube. It is sent on the same beam and helps the lock-in of the rotative optics to obtain the first contact between transmitter and receiver. The "following" signal informs the receiver of its particular position in the beam, because it is possible to cause a separation of different frequencies in the different parts of the beam cross section. (Receiver Figure 18.) So with the exact corrections necessary, continuous contact is achieved through automatic aiming of the transmitters and receivers.

A system of the type just described is described and illustrated in complete detail in my co-pending application, Serial No. 682,957, filed July 14, 1946. Further description thereof is not believed necessary in this application since reference may readily be had to the co-pending case.

Figure 5:
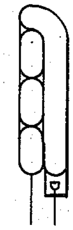
Figure 5 is a side view of the tube of Figure 4.

(i) A marked improvement in the gas discharge tube is achieved by folding the tube upon itself into a compact plane of the desired area, and piling several of these sections up until the necessary tube length is achieved (see Figures 4 and 5). The light from the various portions of the tube then becomes additive and is useful optically because such a source approximates a point source which can be focused, etc., efficiently and yet has the desired area for beam width. Such a tube can provide whatever distribution of light in the beam is required, the cross section of the beam being the image of the gas tube, which is at the focus plane.

Because the light is emitted in broad bands of the light spectrum, very little of it is absorbed as it passes through the gas in overlapping portions of the tube.

The tube thus folded in a non-inductive way presents a very small inductance for a relatively long length of tube, such an embodiment being useful at high radio-frequencies.

A known impedance in radio-frequency can be obtained by forming the tube as a helix or a coil (Figure 6 and 7) so that it possesses a self-inductance when used electrically. This self-inductance is useful in resonant circuits, a special "tank" circuit being formed by the gas-circuit itself in spite of the negative characteristic of the tube.

The tube can be part of the power amplifier's "tank" circuit, or it can oscillate by itself, using this negative resistance characteristic (Figure 15). Such tubes can be housed in an envelope at low gas pressure, the gas inside the envelope being excited by induction with increased efficiency of light output (Figure 8).

The tube may also comprise several successive spirals arranged contiguously or may have the shape of concentric screws.

(j) At radio frequencies greater than 50 mc., a shift in the frequency of the R.-F. generator causes a shift in the band of radiation to a slightly different wavelength. A major change in radio frequency, such as a change from 60 mc., to 100 mc., causes the redistributed energy to emphasize a band of radiation in another part of the spectrum.

By employing a variable oscillator at a very high radio frequency for excitation, it is possible to obtain a desired displacement of the frequency band of the light emission by one or more of the following: (1) by causing certain spectral rays to appear; (2) by increasing the amplitude of particular spectral rays; (3) by broadening a spectral line to the right and/or left so that it becomes a band in that spectral region.

The intensity and position of the spectral band which is obtained depends on the frequency of oscillation, and this band can be somewhat displaced if desired by broadening a given spectral line to one side or the other. In other words, choice of frequency can enhance certain spectral lines in preference to others. Other factors also play a part, the exact details of the light wavelength of radiation and widths of the bands varying, for instance, with the shape of the tube, the pressure of the gas and the density of the exciting current in the tube.

It is then possible to adjust the band of radiation of the gas tube within certain limits by means of a variable U. H. F. excitation and, if desired, to achieve the communication on another frequency carrier (double modulation). It is also possible to achieve a class of modulation by shifting the band of light with a variable frequency oscillator in accordance with the modulation.

(k) When such an R.-F. generator with an audio modulator drives a light source having some lag or inertia such as an incandescent lamp, it is noted that the light will follow the modulation to a much higher frequency than if it is excited directly with the modulation voltage. This is considered due to R.-F. current distribution, which would leave the center of the conductor with little current. This would cause more rapid cooling than if the lamp were directly modulated at audio frequency so the lamp could follow higher frequencies and, more important, the power output of audio modulated light could be increased for a given fidelity of modulation. A similar effect is noticed with gas tubes in that the radio frequency current is more intense about the periphery of the gaseous body of the source and there exists a core of unionized or less ionized gas. This distribution facilitates a more rapid ionization and deionization of the source than if it were directly modulated at the audio modulation frequency. On the other hand radio frequency excitation broadens the light emission into broad bands. This enables the tube, for the same audio output fidelity to be used with greater current densities and to carry a higher output of audio modulated light than it could without the use of radio frequency excitation. For the same intelligibility more powerful audio modulated light can be obtained with this method than with other systems modulated only at audio frequency.

Taking into consideration merely the application of code and speech communication the following other advantages are noteworthy:

(1) First, for example, with this type of xenon tube and R.-F. excitation, there is no limitation in power of the radiation to be produced, and improved efficiency is attained. Such a system is capable of emitting radiation running into kilowatts, if desired. Second, the threshold of sensitivity is lowered with respect to audio systems which corresponds to a signal to noise ratio increase. Consequently, the quantity of light which needs to be emitted to get the same results is smaller than with ordinary audio modulated light. Thus, the overall sensitivity of the system is markedly improved, making possible many different applications and resulting in greater security and reliability. As a consequence, the range in communications is only a question of line of sight, coefficient of transmission depending on the choice of the wavelength of the light radiation; theoretically, the range is not limited except by line of sight and by the weight of the equipment.

(2) A considerable transmitting beam angle up to 35 degrees, afforded by the sensitivity of the system, renders possible the reception of communications from the transmitter, not only with one but with several receivers at the same time if desired.

(3) The large beam angle also results in a considerable degree of relative mobility of the transmitters and receivers.

(4) Transmission in the clear without the use of codes with the resulting speeding up of communications may be used with complete secrecy. This secrecy extends to invisibility; the complete absence of radio-electric irradiation into space; the freedom from interception by any but the correct type of receiver; and the type of the modulation system in use.

(5) The extreme difficulty in jamming this type of communication and the possibility of daylight operation with a correct filter in front of the photosensitive receiver, or without a filter if the photosensitive element has a light response corresponding to the radiation produced by the gas tube.

(6) The system can respond in particular to extremely slow variations of the amplitude of the radio-frequency carrier which make it possible to achieve an infrared barrier which would detect the presence of foreign objects. It would be more difficult to amplify signals of this type corresponding to slow variation of D. C. currents with an audio system, as changes in the order of fractions of a cycle per second would require a "D. C." amplifier.

(7) As a radio frequency is used as carrier the audio modulation introduces only the side band frequencies. The response of the transmitting tube and of the photo-sensitive receiver remain about the same for 10,000 cycles above or below the radio frequency carrier. As a result, in speech transmission the response depends mainly on the compensation and matching of impedances in the equipment. Perfect intelligibility is achieved. High speed code for the same reasons is possible. When this high speed code uses a two-frequency modulation, the current in the transmitting gas tube remains constant, and there is no delay in obtaining radiation which could happen if the tube was completely interrupted.

(8) The system is moreover characterised by its simplicity of operation, its simplicity of starting, and its stability and automatic operation. Since there are no moving parts, except the optics which are outdoors, the device can be enclosed in a water-proof cabinet for operation on board ships.

(9) Due to the special type of excitation of the gas tube it is possible to realize in light communication every combination which can be carried out with ordinary radio, the light beam being the equivalent of a conductor between transmitter and receiver so that the radio-frequency that is utilized is not radiated into space.

While much of the foregoing description has been drawn to infrared communication systems with an xenon filled gas tube as a radiating element, it is not desired to be strictly limited thereto since other types of gas or vapor filled tubes could be used; for example, helium, neon, krypton, argon and other elements that can be described as rare gases. Other radiation frequencies can also be used where desired. Certain metallic vapors may also be utilized as discussed above.

The Government of the United States has a license option under paragraph (*a*), Article 31, of Contract NObs—12911.

What I claim is:

1. A system for emission of light radiation comprising a tube containing a pair of electrodes and at least one of the rare gases and means for exciting said tube solely with radio-frequency current to enhance emission from the gas of light radiation in particular frequency portions of the spectrum said radiation having spectral characteristics distinct from the normal characteristic line spectrum of the gas in the tube.

2. A system for transmission of intelligence comprising a tube containing a pair of electrodes and at least one of the rare gases, means for exciting said tube solely with radio-frequency current to enhance emission from the gas of light radiation having spectral characteristics distinct from the normal characteristic line spectrum of the gas in the tube, and means for modulating said radio-frequency in accordance with intelligence correspondingly to vary said radiation.

3. A system for achieving high-power intelligence transmission comprising a tube containing a pair of electrodes and at least one of the rare gases, and means for supplying modulated radio frequency currents to solely excite said tube to cause the appearance of broad spectral bands in the radiation produced by said tube whereby said radiation is rendered distinct from the normal characteristic line spectrum of the gas in the tube.

4. A system for emission of infrared radiation comprising a tube containing a pair of electrodes and at least one of the rare gases and means for exciting said tube solely with radio-frequency current to enhance emission from the gas of infrared radiation said radiation having spectral characteristics distinct from the normal characteristic line spectrum of the gas in the tube.

5. A system for transmission of intelligence comprising a tube containing a pair of electrodes and at least one of the rare gases, means for exciting said tube solely with radio-frequency current to enhance emission from the gas of infrared radiation said radiation having spectral characteristics distinct from the normal characteristic line spectrum of the gas in the tube, and means for modulating the amplitude of said radio-frequency current in accordance with intelligence correspondingly to vary the intensity of said radiation.

6. A system for transmission of intelligence comprising a tube containing a pair of electrodes and at least one of the rare gases, means for exciting said tube solely with radio-frequency current to enhance emission from the gas of infrared radiation said radiation having spectral characteristics distinct from the normal characteristic line spectrum of the gas in the tube, and means for modulating the frequency of said current in accordance with intelligence correspondingly to vary the spectral distribution of said radiation.

7. A system for transmission of intelligence comprising a tube containing a pair of electrodes and at least one of the rare gases, means for supplying exciting current to said tube in intermittent pulses of short duration to enhance emission from the gas of radiation, and means for modulating the pulses of current in accordance with intelligence correspondingly to vary said radiation.

8. A communication system comprising a tube containing a pair of electrodes and at least one of the rare gases, means for exciting said tube solely with radio-frequency current to enhance emission from the gas of light radiation said radiation having spectral characteristics distinct from the normal characteristic line spectrum of the gas in the tube, a frequency-shift keyer which shifts said radio-frequency between two frequencies, a photosensitive receiver, a radio-frequency receiver adapted to utilize the output of the photosensitive receiver, and a frequency-shift converter adapted to change frequency shifts into conventional telegraphic or Teletype impulses, whereby substantially constant amplitude output of light radiation is maintained simultaneously with the transmission of intelligence through the system.

9. A radiation transmitter comprising a tube containing a pair of electrodes and one of the rare gases, means for solely exciting said tube with current of two radio frequencies and enhancing its emission of radiation, and means to vary at audio frequency the relative percentages of the two radio-frequency currents in the gas tube while maintaining their total current constant.

10. A system for transmission of intelligence comprising a tube containing two electrodes and at least one of the rare gases, means for solely exciting said tube with current of radio-frequencies to enhance emission from the gas of infrared radiation, said means consisting of two radio-frequency sources modulated 180° out of phase relative to each other whereby substantially constant light output is obtained.

11. A system for emission of infrared radiation comprising a tube containing a pair of electrodes and xenon gas, and means for exciting said tube solely with radio-frequency current to enhance emission from the xenon gas of broad-band infrared radiation having spectral characteristics distinct from the normal characteristic line spectrum of the gas in the tube.

12. An infrared transmitter comprising a tube containing a pair of electrodes and one of the rare gases, a radio-frequency generator to excite the tube solely with radio frequency currents and enhance its emission of infrared radiation having spectral characteristics distinct from the normal characteristic line spectrum of the gas in the tube, and a frequency shift keyer to modulate the generator in accordance with telegraph or Teletype impulses.

13. In a light radiation transmitter, a gas tube folded upon itself to form a plane several layers thick to provide a compact source of radiation, and means for supplying radio-frequency current to said tube for enhancing emission from the gas of light radiation in particular frequency portions of the spectrum, the resulting radiation having spectral characteristics disinct from the normal characteristic absorption spectrum of the gas in the tube, whereby transparency of the gas for its own radiation is obtained.

14. In a system for emission of light radiation, means to shift a band of radiation comprising a gas filled tube and a variable radio-frequency excitor for the tube whereby the frequency of exciting current may be varied to shift the band of radiation.

15. In an infrared transmitter, means to obtain peak-current operation comprising a tube filled with a rare gas and a radio-frequency generator whose power amplifier operates in Class C condition for providing the sole excitation for the tube, whereby markedly greater infrared radiation output is obtained, said radiation having spectral characteristics distinct from the normal characteristic line spectrum of the gas in the tube.

16. In a light radiation transmitter, a gas tube, a radio-frequency exciter, and means for starting the gas tube into conduction including an impedance connected to the output of said exciter to provide a radio-frequency voltage sufficient to cause tube breakdown said impedance having a value to match the impedance of said tube during tube conduction.

17. In a light radiation transmitter, a gas tube containing a pair of electrodes and coiled upon itself to form a unit one or more coils thick which possesses electrical self-induction and provides a compact source of radiation, and a radio-frequency generator for providing the sole excitation for the tube to enhance emission from the gas of light radiation in particular frequency portions of the spectrum, the resulting radiation having spectral characteristics distinct from the normal characteristic absorption spectrum of the gas in the tube, whereby transparency of the gas for its own radiation is obtained.

18. In a light radiation transmitter, a gas tube formed of a plurality of convolutions, said tube having electrical self-induction for forming a special gaseous oscillating circuit and providing a compact source of radiation, and means which includes said tube for causing radio frequency oscillation of the tube.

19. In a light radiation transmitter, a gas tube, a radio-frequency exciter for the tube, means for starting the gas tube into conduction that utilizes resonance to get a radio frequency voltage sufficient to cause the tube to carry current, and a relay operated by said exciter for disconnecting said tube from said starting means when said tube carries current.

20. In a light radiation transmitter, a gas tube, a radio-frequency exciter for said tube, and means for starting the gas tube into conduction that utilizes standing voltage waves resulting from a mismatch of impedances between the tube and said means to get sufficient voltage for tube breakdown, whereupon the conducting tube approximately matches impedance with the above means.

21. In a light transmitter, a gas-tight envelope containg a gas at low pressure, a gas tube formed of a plurality of convolutions and mounted within said envelope, and means for supplying radio frequency currents to said tube to cause light emission from the gas in the envelope by induction.

22. A device for the emission of light comprising a gas-tight envelope containing a gas at low pressure and a gas tube formed of a plurality of convolutions and mounted within said envelope, one end of said tube having gaseous communication with said envelope.

23. A device for the emission of light comprising a gas-tight envelope containing a gas at low pressure and a gas tube formed of a plurality of convolutions and mounted within said envelope, said tube being capable of radio frequency excitation, said gas within the envelope being capable of emitting light by induction when said tube is excited.

24. A two-way infrared communication system utilizing two channels operating simultaneously on one or more different radio frequencies to communicate intelligence between two stations, comprising at each station a transmitter having a gas tube and means for solely exciting said tube with current having one of said frequencies in accordance with intelligence to be transmitted and thereby enhancing the infrared radiation output of the tube said radiation having spectral characteristics distinct from the normal characteristic line spectrum of the gas in the tube; and a receiver comprising a photosensitive device, and means tuned to one of said frequencies which is different from any frequency transmitted by the transmitter at that station, for converting the output of said photo-sensitive device to useful intelligence; one of said transmitters operating in one of said channels and the other transmitter operating in another channel.

25. A system for the emission of infrared radiation comprising a gas tube containing two electrodes and at least one of the rare gases, means for solely exciting said tube with radio frequency current to enhance emission from the tube of infrared radiation, and means for modulating the frequency of said current whereby substantially constant output amplitude of infrared radiation is obtained.

26. A radiation transmitter comprising a tube containing two electrodes and one of the rare gases, means for solely exciting said tube with currents at two radio frequencies to enhance its emission of radiation, and means to supply to said tube first one and then the other of said frequencies alternately to correspond to telegraphic impulses and spaces, whereby substantially constant amplitude of light output is obtained.

27. In a light radiation communication system utilizing light pulses corresponding to Class C type excitation, a reception unit comprising a photosensitive element including an electron multiplier, a high amplification factor radio frequency receiver, and means coupling the output of said element with said receiver, said means including a resonant circuit for converting to sinusoidal form the class C type impulses which appear in the otput of said element.

28. In a communication system including a single light emitting gas tube having a pair of electrodes, means for exciting said tube solely with a plurality of currents having different radio frequencies simultaneously for enhancing the light radiation of the tube in particular frequency portions of the spectrum, said radiation having spectral characteristics distinct from the normal characteristic line spectrum of the gas in the tube, and a plurality of receivers tuned to said different frequencies and including photosensitive means whereby multiplex light communication is achieved.

29. A device for emitting extremely short and powerful light pulses of the order of one microsecond comprising a tube containing xenon gas, and means for exciting the tube solely with a short duration intermittent current pulse of a corresponding order to enhance the light emission from the gas.

30. A system for transmission of intelligence as set forth in claim 2, in which the rare gas in the tube is xenon.

31. A system for transmission of intelligence comprising a gas tube folded upon itself to form a plane several layers thick to provide a compact source of radiation, means for supplying radiofrequency current to provide the sole excitation for said tube for enhancing emission from the gas of light radiation having spectral characteristics distinct from the normal characteristic absorption spectrum of the gas in the tube, whereby transparency of the gas for its own radiation is obtained, and means for modulating said radiofrequency in accordance with intelligence correspondingly to vary said radiation.

32. A system for transmission of intelligence comprising a gas filled tube having a pair of electrodes, means for supplying radio frequency current to provide the sole excitation for said tube to cause the appearance of broad spectral bands of radiation from said tube in addition to the normal absorption spectrum of the gas in the tube, and means for frequency modulating said radio frequency current to cause shifting of said spectral bands of radiation.

33. A system for transmission of intelligence comprising a tube containing at least one of the rare gases, means for supplying current to said tube at radio-frequency, means for starting said tube into conduction including an impedance connected to the output of said supplying means to provide a radio-frequency voltage sufficient to cause tube breakdown and start the emission of light radiation from the gas, said impedance having a value to match the impedance of said tube during conduction, and means for modulating said radio frequency in accordance with intelligence correspondingly to vary said radiation.

34. A system for transmission of intelligence as set forth in claim 2, in which said tube is coiled upon itself to form a layer at least one coil thick which possesses electrical self-induction and provides a compact source of radiation.

35. A system for transmission of intelligence comprising a gas tube containing at least one of the rare gases and formed of a plurality of convolutions to have electrical self-induction to provide a special gaseous oscillating circuit and a compact source of radiation, means including said tube for causing radio frequency oscillation of the tube, and means for modulating the radio frequency oscillation of the tube in accordance with intelligence correspondingly to vary the radiation from said tube.

36. A system as set forth in claim 2, and means for starting the gas tube into conduction utilizing standing voltage waves resulting from a mismatch of impedances between the tube and the starting means to achieve sufficient voltage for tube breakdown, said tube having an impedance after breakdown approximately matching the impedance of the starting means.

37. A system as set forth in claim 2 in which said tube comprises a gas tight envelope containing a gas at low pressure and a gas tube formed of a plurality of convolutions and mounted within said envelope, said radio frequency current supplying means being connected to said convolute tube to cause light emission from the gas in the envelope by induction.

38. A system as set forth in claim 2 in which said tube comprises a gas tight envelope containing a gas at low pressure and a gas tube formed of a plurality of convolutions and mounted within said envelope one end of said tube having gaseous communication with said envelope.

39. A system as set forth in claim 2, and means for starting the gas tube into conduction that utilizes resonance to get a radio frequency voltage sufficient to cause the tube to carry current, and a relay operated by said excited for disconnecting said tube from said starting means when said tube carries current.

40. A system for the emission of light radiation comprising a tube containing a pair of electrodes and a gas, and means for exciting said tube solely with radio-frequency current to enhance emission from the gas of light radiation in particular frequency portions of the spectrum, said radiation having spectral characteristics distinct from the normal line spectrum of the gas in the tube.

41. A system for the emission of light radiation comprising a tube containing a pair of electrodes and a gas selected from the group consisting of the rare gases, mercury vapor, and caesium vapor, and means for exciting said tube solely with radio-frequency current to enhance emission from the gas of light radiation in particular frequency portions of the spectrum, said radiation having spectral characteristics distinct from the normal line spectrum of the gas in the tube.

GUY TOUVET.

REFERENCES CITED

The following references are of record in the file of this patent:

UNITED STATES PATENTS

| Number | Name | Date |
| --- | --- | --- |
| 1,866,337 | Alexanderson | July 26, 1932 |
| 1,935,423 | Wayringer | Nov. 14, 1933 |
| 2,015,885 | Dallenbach | Oct. 1, 1935 |
| 2,017,897 | Emersleben | Oct. 22, 1935 |
| 2,031,639 | Finch | Feb. 25, 1936 |
| 2,032,588 | Miller, Jr. | Mar. 3, 1936 |
| 2,100,348 | Nicolson | Nov. 3, 1937 |
| 2,142,648 | Linder | Jan. 3, 1939 |
| 2,220,201 | Bliss | Nov. 5, 1940 |
| 2,404,696 | Deal | July 23, 1946 |
| 2,421,468 | Singer | June 3, 1947 |